Patented Aug. 27, 1935

2,012,333

UNITED STATES PATENT OFFICE 2,012,333

PROCESS OF PRODUCING BUTYL AMINES

Herrick Ransom Arnold, Elmhurst, Del., assignor to E. I. du Pont de Nemours & Company, Wilmington, Del., a corporation of Delaware No Drawing. Application June 1, 1933, Serial No. 673,856

6 Claims. (Cl. 260—127)

This invention relates to a process for producing amines synthetically from ammonia and alcohols and it pertains in particular to the catalytic synthesis of butyl amines from ammonia and butanol through the use of a catalyst comprising aluminum silicate.

It has already been described in H. R. Arnold U. S. Patent No. 1,799,722, issued April 7, 1931, that amines may be prepared by catalytic synthesis from ammonia and alcohols in the presence of various catalysts and under various conditions. The present invention has as an object the use of a special type of catalyst for this reaction. A further object of the invention comprises the use of aluminum silicate as a catalyst, and particularly naturally occurring aluminum silicate in the form of clay.

The invention in one of its forms may be carried out by passing a vapor mixture containing butanol and ammonia in proportions ranging from a large molecular excess of butanol to a large molecular excess of ammonia over a catalyst comprising clay, at a temperature of 300° C. to 500° C. and at a suitable space velocity.

The following examples illustrate various forms of the invention:

Example 1

A vapor mixture comprising equimolecular proportions of ammonia and butyl alcohol was passed over "Doucil" at a temperature of 400° C. and at a vapor space velocity of 500 cc. per cc. of catalyst per hour yielding a mixture of mono-, di- and tributylamine.

Example 2

A vapor mixture containing 2.5 moles of ammonia and one mole of butyl alcohol was passed over kaolin at 375° C. and at a vapor space velocity of 1625 cc. per cc. of catalyst per hour yielding a mole percent conversion of 5.4 for monobutylamine, and 9.5 for combined di- and tributylamine.

Example 3

A vapor mixture containing 2.5 moles of ammonia and one mole of butyl alcohol was passed over Indianaite at 325° C. and at a vapor space velocity of 1500 cc. per cc. of catalyst per hour yielding a mole percent conversion of 8.5 for monobutylamine, and 14.2 for combined di- and tributylamine.

The reaction may be applied not only to the production of butylamine, as stated in the above examples, but also to the production of the other amines such as the methyl, ethyl, and propyl amines and the higher alkyl amines from the corresponding alcohols and ammonia. The space velocities may be varied considerably from those given in the examples e. g., from below 500 to above 4000. The temperature may also vary within wide limits, e. g., 250° C. to 500° C. but the preferred range is 300° C. to 400° C.

The invention is concerned particularly with the use of natural clays, but artificial aluminum silicates, e. g., the zeolite of Example 4 may also be used "Doucil", the catalyst used in Example 1 is a water softener having the formula $$Al_2O_3.Na_2O.5SiO_2.$$

I claim:

1. The process for the production of butyl amines which comprises passing a mixture of butyl alcohol and ammonia at a temperature range from 300° C. to 500° C. over a catalyst comprising essentially aluminum silicate.

2. The process of claim 1 characterized in that the butyl alcohol is in molecular excess over the ammonia present in the reaction mixture.

3. A process for the production of butyl amines which comprises passing a mixture of butyl alcohol vapor and ammonia of a molar ratio of approximately 1:2.5, at a space velocity of about 1500 over Indianaite heated to a temperature of 350° C.

4. A process for the production of butyl amines which comprises passing a mixture of butyl alcohol vapor and ammonia over Indianaite at temperatures ranging from 250° C. to 500° C.

5. A process for the production of butyl amines which comprises passing a mixture of butyl alcohol and ammonia over a catalyst comprising essentially aluminum silicate, at temperatures ranging from 300° C. to 400° C.

6. A process for the production of butyl amines which comprises passing a mixture of butyl alcohol and ammonia of a molar ratio of approximately 1:2.5 over a catalyst comprising essentially aluminum silicate at temperatures ranging from 250° C. to 500° C.

HERRICK R. ARNOLD.